United States Patent
Wu et al.

(10) Patent No.: US 9,105,244 B2
(45) Date of Patent: Aug. 11, 2015

(54) PANEL CONTROL APPARATUS AND OPERATING METHOD THEREOF

(75) Inventors: Tung-Ying Wu, Tainan (TW); Chun-Te Ho, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 402 days.

(21) Appl. No.: 13/473,444

(22) Filed: May 16, 2012

(65) Prior Publication Data

US 2013/0307835 A1     Nov. 21, 2013

(51) Int. Cl.
| | |
|---|---|
| G06T 9/00 | (2006.01) |
| G09G 3/36 | (2006.01) |
| H04N 19/42 | (2014.01) |
| G06F 17/30 | (2006.01) |

(52) U.S. Cl.
CPC ........ G09G 3/3611 (2013.01); G06F 17/30017 (2013.01); H04N 19/00478 (2013.01); G09G 2320/103 (2013.01); G09G 2330/021 (2013.01); G09G 2340/02 (2013.01); G09G 2340/16 (2013.01); G09G 2360/18 (2013.01)

(58) Field of Classification Search
CPC ............. H04N 19/00; H04N 19/00478; G06F 17/30017
USPC ................... 345/547, 694; 382/232
See application file for complete search history.

(56) References Cited

U.S. PATENT DOCUMENTS

| | | | | |
|---|---|---|---|---|
| 5,487,172 | A * | 1/1996 | Hyatt | 712/32 |
| 5,784,047 | A * | 7/1998 | Cahill et al. | 345/660 |
| 5,884,042 | A * | 3/1999 | Winter et al. | 709/231 |
| 6,340,994 | B1 * | 1/2002 | Margulis et al. | 348/625 |
| 6,456,340 | B1 * | 9/2002 | Margulis | 348/745 |
| 6,850,252 | B1 * | 2/2005 | Hoffberg | 715/716 |
| 8,279,138 | B1 * | 10/2012 | Margulis | 345/1.1 |
| 2002/0011943 | A1 * | 1/2002 | Deeley et al. | 341/67 |
| 2002/0063807 | A1 * | 5/2002 | Margulis | 348/745 |
| 2002/0191112 | A1 * | 12/2002 | Akiyoshi et al. | 348/700 |
| 2004/0239698 | A1 * | 12/2004 | Kamada et al. | 345/714 |
| 2005/0162566 | A1 * | 7/2005 | Chuang et al. | 348/714 |

(Continued)

FOREIGN PATENT DOCUMENTS

| | | |
|---|---|---|
| TW | 200605637 | 2/2006 |
| TW | I284872 | 8/2007 |

(Continued)

OTHER PUBLICATIONS

"Office Action of Taiwan Counterpart Application", issued on May 20, 2014, p. 1-p. 4.

*Primary Examiner* — Michael J Eurice
(74) *Attorney, Agent, or Firm* — J.C. Patents

(57) ABSTRACT

A panel control apparatus and an operating method thereof are provided, and which includes a scalar and a timing controller. The scalar transmits a present display data for composing a display frame, and determines whether to generate a refresh request signal according to a state of the display frame. The timing controller includes a memory, an over driving unit and a panel self refresh unit. When the refresh request signal is not generated, the over driving unit converts the present display data into an over driving display data according to a previous compression data from the memory. When the refresh request signal is generated, the panel self refresh unit compresses the present display data into a refresh display data, and stores the refresh display data into the memory.

4 Claims, 2 Drawing Sheets

(56) References Cited

U.S. PATENT DOCUMENTS

| | | | |
|---|---|---|---|
| 2006/0139289 A1* | 6/2006 | Yoshida et al. | 345/98 |
| 2007/0035706 A1* | 2/2007 | Margulis | 353/122 |
| 2007/0035707 A1* | 2/2007 | Margulis | 353/122 |
| 2007/0053513 A1* | 3/2007 | Hoffberg | 380/201 |
| 2012/0327139 A1* | 12/2012 | Margulis | 345/690 |
| 2013/0076769 A1* | 3/2013 | Park et al. | 345/547 |

FOREIGN PATENT DOCUMENTS

| | | |
|---|---|---|
| TW | 200816118 | 4/2008 |
| TW | 200901762 | 1/2009 |

* cited by examiner

PANEL CONTROL APPARATUS AND OPERATING METHOD THEREOF

BACKGROUND OF THE INVENTION

1. Field of the Invention

The invention generally relates to a panel control apparatus and an operating method thereof, in particular, to a panel control apparatus and an operating method that compression methods are switched according to a state of a display frame.

2. Description of Related Art

Nowadays, for pursuing higher resolutions and clearer images, the occupation of memory space of image data is getting larger incidentally. Based on the business consideration, general panel control apparatuses utilize image compression techniques to reduce the memory space used by a timing controller (T-CON), and the benefit to lower cost is achieved. Therefore, the image compression techniques are getting more important to the panel control apparatuses.

In the panel control apparatus, both an over driving (OD) technique and a panel self refresh (PSR) technique utilize different image compression techniques to achieve the required functions thereof respectively. Wherein, the over driving technique compresses a previous display data into the memory, and then generates an over driving display data according to the comparison between the previous display data and a present display data. Thus, the panel control apparatus can adjust a driving signal according to changes of frames so as to accelerate the state transition of the liquid crystal and improve the reaction time of the pixels. On the other hand, the panel self refresh technique compresses the display data into the memory while detecting that the display frame is static. Thus, during the period that the frame is static, the display data stored in the memory is displayed so as to save power consumption.

Nevertheless, the both techniques described above are utilized at different timing and with different mechanisms of image compression. Therefore, it is an important topic for the design of the panel control apparatus to solve how to integrate the both techniques described above. In addition, following the integration of both the techniques, the memory will be increased, and will cause the volume and the manufacturing cost of the panel control apparatus to be risen inevitably.

SUMMARY OF THE INVENTION

Accordingly, the present invention is directed to a panel control apparatus, and further to switch between an over driving technique and a panel self refresh technique selectively according to a display frame, and utilize display data under different compression techniques stored in the same memory. Thus, the volume of the panel control apparatus could be decreased.

The present invention is directed to an operation method of a panel control apparatus, the method determines whether to generate a refresh request signal according to a state of a display frame to switch between different compression techniques, and utilize the display data under different compression techniques stored in the same memory. Thus, the manufacturing cost of the panel control apparatus will be reduced.

The present invention is directed to a panel control apparatus which includes a scalar and a timing controller. The scalar transmits a present display data to compose a display frame, and determines whether to generate a refresh request signal according to a state of the display frame. The timing controller includes a memory, an over driving unit, and a panel self refresh unit. The over driving unit is electrically connected to the memory. When the refresh request signal is not generated, the over driving unit converts the present display data into an over driving display data according to a previous compression data from the memory. The panel self refresh unit is electrically connected to the memory. When the refresh request signal is generated, the panel self refresh unit compresses the present display data into a refresh display data, and stores the refresh display data into the memory.

According to an embodiment of the present invention, the scalar determines whether the state of the display frame is static. When the state of the display frame is static, the scalar generates the refresh request signal. When the state of the display frame is dynamic, the scalar stops generating the refresh request signal.

According to an embodiment of the present invention, the panel control apparatus further includes a switch unit. The switch unit is electrically connected to the memory and the over driving unit. Wherein, when the refresh request signal is not generated, the switch unit transmits the over driving display data. When the refresh request signal is generated, the switch unit transmits the refresh display data from the memory.

According to an embodiment of the present invention, the over driving unit includes an over driving enabler, an over driving compressor, and an over driving generator. The over driving enabler stops generating an over driving enabling signal according to the refresh request signal. The over driving compressor reads the previous compression data from the memory according to the over driving enabling signal. The over driving generator looks up an over driving table according to the previous compression data and the present display data, and generates the over driving display data accordingly.

According to an embodiment of the present invention, the panel self refresh unit includes a self refresh enabler and a self refresh compressor. The self refresh enabler generates a refresh enabling signal according to the refresh request signal. The self refresh compressor compresses the present display data into the refresh display data according to the refresh enabling signal, and generates a refresh replying signal. Wherein, the scalar stops transmitting the present display data according to the refresh replying signal.

According to another scope, the present invention is directed to an operation method of a panel control apparatus including the following steps: transmit a present display data to compose a display frame; determine whether to generate a fresh request signal according to a state of the display frame; when the refresh request signal is not generated, convert the present display data into an over driving display data according to a previous compression data from a memory of the panel control apparatus; when the refresh request signal is generated, compress the present display data into a refresh display data, and store the refresh display data into the memory.

Based on the description above, the panel control apparatus and the operation method thereof according to the present invention provide a method to switch to a different image compression method according to the display frame, and utilize the display data under the different compression techniques stored in the same memory. Thus, the volume and the manufacturing cost of the panel control apparatus will be reduced.

BRIEF DESCRIPTION OF THE DRAWINGS

The accompanying drawings are included to provide a further understanding of the invention, and are incorporated in and constitute a part of this specification. The drawings

DESCRIPTION OF THE EMBODIMENTS

Figure 1:
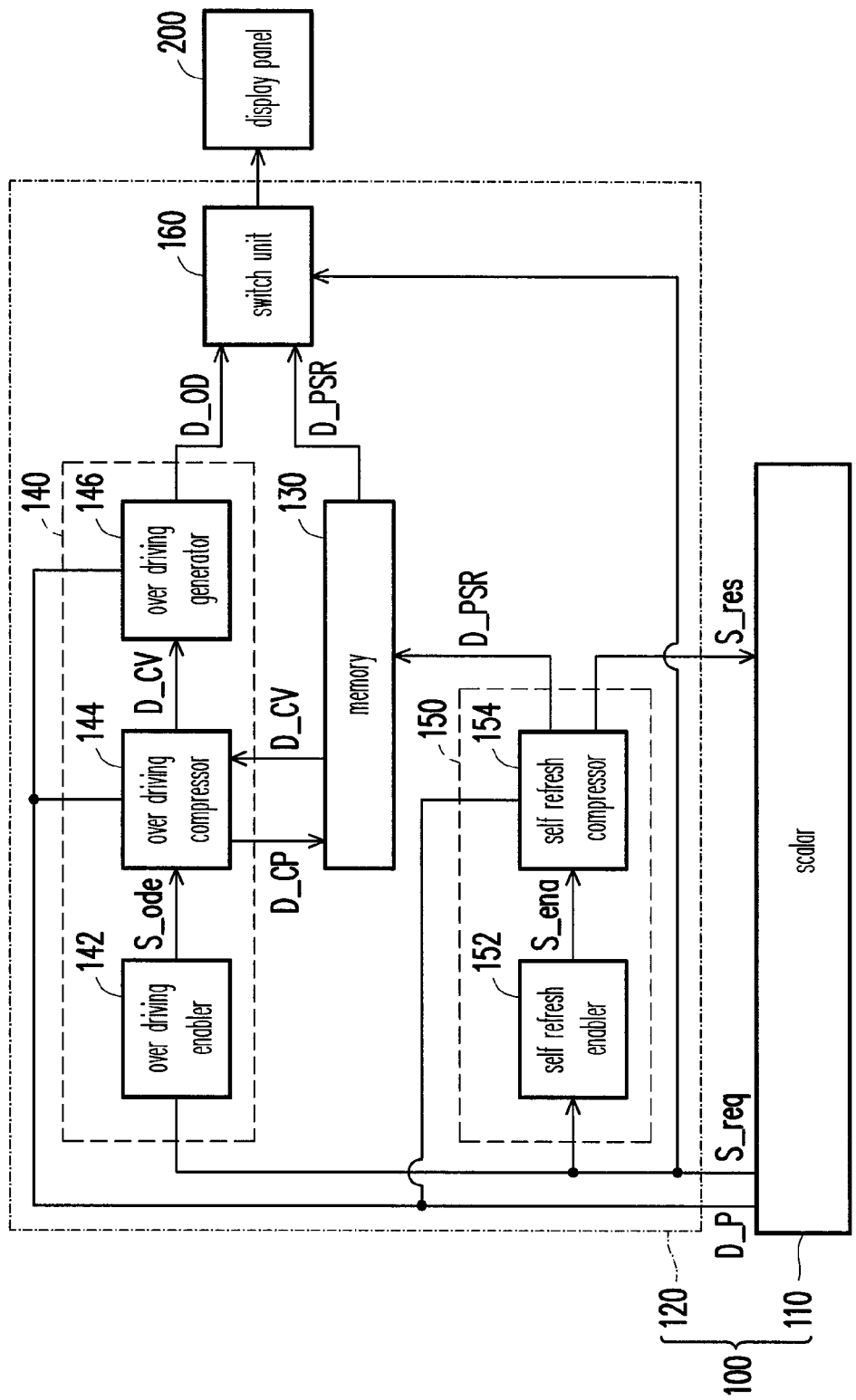
FIG. 1 shows a schematic diagram of a panel control apparatus according to an embodiment of the invention.

A panel control apparatus and an operation method thereof according to the embodiments of the invention switch different compression techniques correspondingly according to a state of a display frame, and reduce memory space used by a timing controller by sharing the same memory, and the benefit to lower the cost is achieved. For better understanding of the invention, the embodiments below are presented as examples which can be surely implemented accordingly. Besides, wherever possible, the same reference numbers, components, or steps are used in the drawings and the description to refer to the same or like parts.

FIG. 1 shows a schematic diagram of a panel control apparatus according to an embodiment of the invention. Referring to FIG. 1, a panel control apparatus 100 is used to control a display panel 200, and includes a scalar 110 and a timing controller 120. Wherein, the scalar 110 transmits a present display data D_P to compose a display frame so as to allow the display panel 200 to display the corresponding display frame under the control of the panel control apparatus 100. The scalar 110 determines whether to generate a refresh request signal S_req according to a state of the display frame.

The timing controller 120 includes a memory 130, an over driving unit 140, a panel self refresh unit 150, and a switch unit 160. The over driving unit 140 is electrically connected to the memory 130. Besides, when the refresh request signal S_req is not generated, the over driving unit 140 converts the present display data D_P into an over driving display data D_OD according to a previous compression data D_CV. The panel self refresh unit 150 is electrically connected to the memory 130. In addition, when the refresh request signal S_req is generated, the panel self refresh unit 150 compresses the present display data D_P into a refresh display data D_PSR, and stores the refresh display data D_PSR into the memory 130.

The switch unit 160 is electrically connected to the memory 130 and the over driving unit 140. Wherein, when the refresh request signal S_req is not generated, the switch unit 160 transmits the over driving display data D_OD so as to allow the display panel 200 to display the corresponding display frame according to the over driving display data D_OD. Otherwise, when the refresh request signal S_req is generated, the switch unit 160 transmits the refresh display data D_PSR from the memory 130 so as to allow the display panel 200 to display the corresponding display frame according to the refresh display data D_PSR.

In other words, the scalar 110 performs motion detection to the display frame displayed by the display panel 200 to determine whether the present display frame is correspondent with the generation condition of the refresh request signal S_req. And, the timing controller 120 decides the method of the over driving or the panel self refresh (PSR) according to the refresh request signal S_req to compress the present display data D_P, and generates the corresponding over driving display data D_OD or the refresh display data D_PSR.

Specifically, if the present display frame is not correspondent with the generation condition of the refresh request signal S_req (e.g. the state of the display frame is static), the scalar 110 will not generate the refresh request signal S_req. In the mean time, the timing controller 120 will not receive the refresh request signal S_req, and can not return a refresh replying signal S_res. Since the timing controller 120 is unable to return the refresh replying signal S_res, the scalar 110 will keep transmitting the present display data D_P to the timing controller 120.

On the other hand, under the condition that the timing controller 120 is unable to receive the refresh request signal S_req, the over driving unit 140 is enabled and the panel self refresh unit 150 is disabled. Thus, at this time, the over driving unit 140 converts the present display data D_P into the over driving display data D_OD according to the previous compression data D_CV stored in the memory 130. Wherein, the previous compression data D_CV is formed with the compression of the corresponding display data of the previous display frame. Meanwhile, the display panel 200 displays the present display frame according to the over driving display data D_OD. Moreover, at this time, the panel self refresh unit 150 stops operating.

On the contrary, when the present display frame is correspondent with the generation condition of the refresh request signal S_req (e.g. the display frame is dynamic), the scalar 110 generates the refresh request signal S_req. Meanwhile, the timing controller 120 receives the refresh request signal S_req, and returns the refresh replying signal S_res correspondingly. Because the timing controller 120 returns the refresh replying signal S_res, the scalar 110 stops transmitting the present display data D_P to the timing controller 120.

On the other hand, under the condition that the timing controller 120 receives the refresh request signal S_req, the over driving unit 140 is disabled, and the panel self refresh unit 150 is enabled. Thus, at this time, the panel self refresh unit 150 compresses the present display data D_P into the refresh display data D_PSR, and stores the refresh display data D_PSR into the memory 130. In the mean time, the scalar 110 need not transmit the present display data D_P continuously, and the display panel 200 still can display the present display frame according to the refresh display data D_PSR stored in the memory 130. Furthermore, at this time, the over driving unit 140 stops operating.

Figure 2:
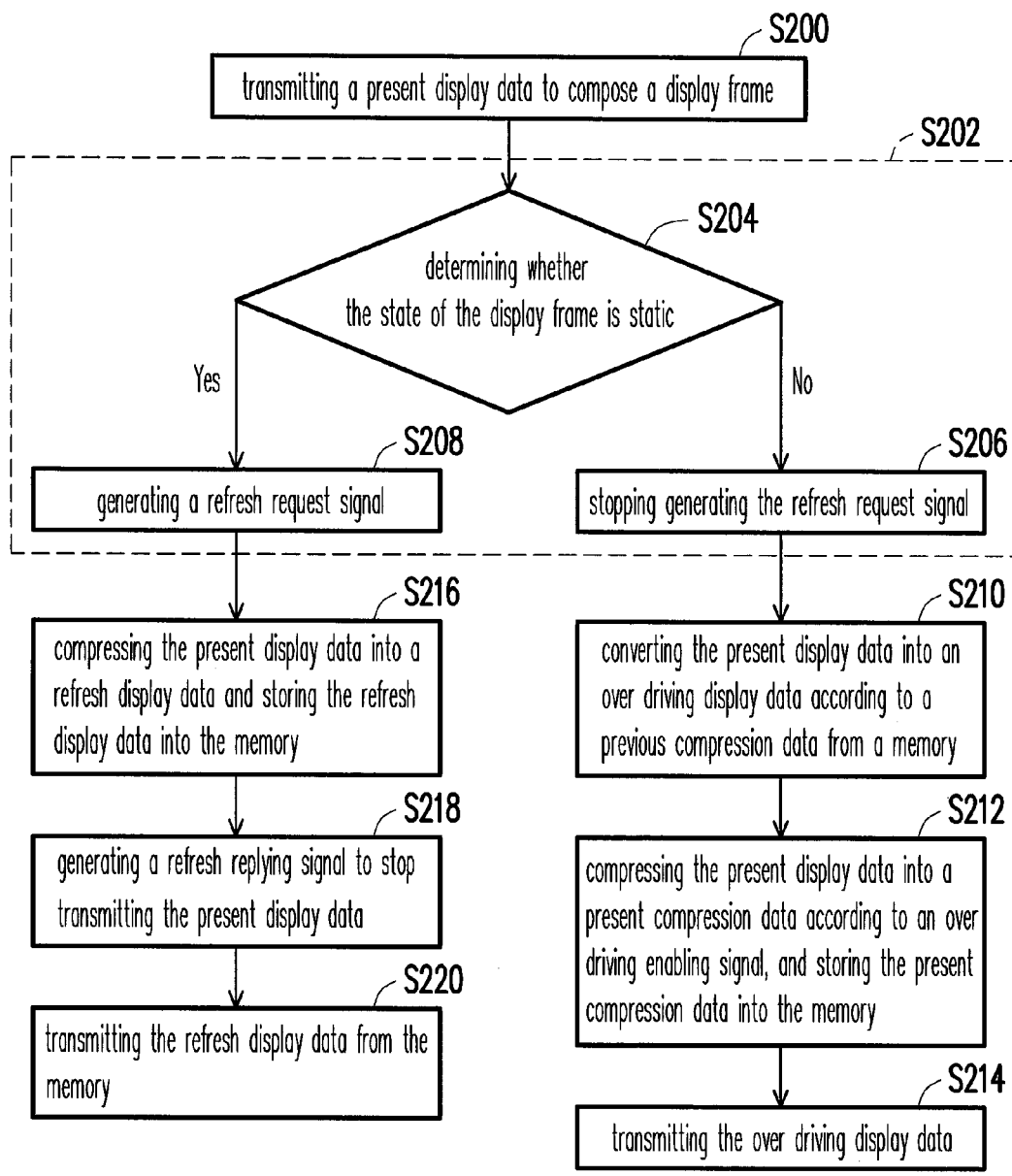
FIG. 2 shows a flowchart of an operation method of the panel control apparatus according to an embodiment of the invention.

Moreover, the over driving unit 140 includes an over driving enabler 142, an over driving compressor 144, and an over driving generator 146. And, the panel self refresh unit 150 includes a self refresh enabler 152 and a self refresh compressor 154. Besides, FIG. 2 shows a flowchart of an operation method of the panel control apparatus according to an embodiment of the invention. Please refer to both FIG. 1 and FIG. 2 hereafter for further illustrating the panel control apparatus.

The scalar 110 transmits the present display data D_P to compose the display frame (step S200), and determines whether to generate the refresh request signal S_req according to the state of the display frame (step S202).

In the step S202 according to the embodiment, the scalar 110 determines whether the state of the display frame is static (step S204) to regard as the basis of the generation of the refresh request signal S_req. In other words, when the scalar 110 determines that the display frame is dynamic, the scalar 110 stops generating the refresh request signal S_req (step S206). On the contrary, when the scalar 110 determines that the display frame is static, the scalar 110 generates the refresh request signal S_req (step S208).

When the refresh request signal S_req is not generated, as shown in step S210, the over driving unit 140 converts the present display data D_P into the over driving display data D_OD according to the previous compression data D_CV from the memory 130 of the panel control apparatus 100.

In the step S210, i.e. in the procedure that the present display data D_P is converted into the over driving display data D_OD, since the over driving enabler 142 can not receive the refresh request signal S_req, the over driving enabler 142 generates the over driving enabling signal S_ode continuously. At this time, the over driving compressor 144 reads the previous compression data D_CV from the memory 130 according to the over driving enabling signal S_ode, and transmits the previous compression data D_CV to the over driving generator 146. The over driving generator 146 looks up an over driving table according to the previous compression data D_CV and the present display data D_P. Wherein, the establishment and the look-up method of the over driving table may be the prior art in the area and will not be described herein in detail.

In addition, as shown in step S212, the over driving compressor 144 further compresses the present display data D_P into the present compression data D_CP according to the over driving enabling signal S_ode, and the present compressor data D_CP is stored in the memory 130. Wherein, the present compression data D_CP which the over driving compressor 144 compresses and stores into the memory 130 is the previous compression data D_CV of the next display frame.

Noteworthily, the sequence of the step S210 and the step S212 is one implementation method according to the embodiment. In an operation method of the panel control apparatus 100, the present display data D_P could be compressed into the present compression data D_CP and stored in the memory 130 firstly (step S212). Then, the present display data D_CP could be converted into the over driving display data D_OD (step S210). But, the invention is not limited thereto.

Moreover, as shown in the step S214, because the switch unit 160 dose not receive the refresh request signal S_req, the switch unit 160 transmits the over driving display data D_OD generated by the over driving generator 146 to the display panel 200 so as to allow the display panel 200 to display the present display frame according to the over driving display data D_OD.

On the other hand, when the refresh request signal S_req is generated, as shown in step S216, the panel self refresh unit 150 compresses the present display data D_P into the refresh display data D_PSR, and stores the refresh display data D_PSR into the memory 130.

In the step S216, i.e. in the procedure that the present display data D_P is compressed into the refresh display data D_PSR and the refresh display data D_PSR is stored into the memory 130, because the self refresh enabler 152 receives the refresh request signal S_req, the self refresh enabler 152 further generates a refresh enabling signal S_ena according to the refresh request signal S_req, and transmits the refresh enabling signal S_ena to the self refresh compressor 154. Meanwhile, the self refresh compressor 154 compresses the present display data D_P into the refresh display data D_PSR according to the refresh enabling signal S_ena, and stores the refresh display data D_PSR into the memory 130.

Besides, as shown in the step S218, the self refresh compressor 154 further generates a refresh replying signal S_res, and transmits the refresh replying signal S_res to the scalar 110 to allow the scalar 110 to stop transmitting the present display data D_P to the timing controller 120 continuously. It is noticeable herein that the sequence of the step S216 and the step S218 is one implementation method according to the embodiment, and it is not limited thereto.

Moreover, as shown in the step S220, because the switch unit 160 receives the refresh request signal S_req, the switch unit 160 transmits the refresh display data D_PSR from the memory 130 to the display panel 200 so as to allow the display panel 200 to display the present display frame according to the refresh display data D_PSR.

For example, under the condition that the display frame is continuously dynamic, the scalar 110 does not generate the refresh request signal S_req, and transmits the present display signal D_P to the timing controller 120. In the meantime, the timing controller 120 further compresses the present display signal D_P and looks up the over driving table to generate the over driving display data D_OD according to the over driving procedure progressed by the over driving unit 140. Thus, the display panel 200 displays the display frame according to the over driving display data D_OD. However, once the display frame becomes static, the scalar 110 will generate the refresh request signal S_req. In the meantime, the timing controller 120 is switched to a panel self refresh mode, that is, the timing controller 120 drives the display panel 200 according to the refresh display data D_PSR stored in the memory 130.

In summary, the panel control apparatus according to the embodiment of the invention utilizes the operation method and the construction that the over driving unit and the panel self refresh unit share the same memory to reduce the volume and the manufacturing cost of the panel control apparatus. Wherein, when the display frame is a dynamic frame, the display panel displays the display frame according to the over driving display data generated by the over driving unit. On the contrary, when the display frame is static, the timing controller reads the refresh display data from the memory, and the display panel displays the display frame according to the refresh display data.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A panel control apparatus, comprising:
   a scalar, transmitting a present display data to compose a display frame, wherein the scalar determines whether a state of the display frame is static, when the state of the display frame is static, the scalar generates a refresh request signal, and when the state of the display frame is dynamic, the scalar stops generating the refresh request signal; and
   a timing controller, comprising:
   a memory;
   an over driving unit, electrically connected to the memory, and only when the scalar stops generating the refresh request signal, the over driving unit converts the present display data into an over driving display data according to a previous compression data from the memory;
   a panel self refresh unit, wherein only when the scalar generates the refresh request signal, the panel self refresh unit compresses the present display data into a refresh display data, and stores the refresh display data into the memory, and the panel self refresh unit comprises:
   a self refresh enabler, electrically connected to the scalar, wherein the self refresh enabler generates a refresh enabling signal according to the refresh request signal when the scalar generates the refresh request signal, and the self refresh enabler stops generating the refresh enabling signal when the scalar stops generating the refresh request signal; and a self refresh compressor, electrically connected to the memory and compressing the present display data into the refresh display data according to the refresh enabling signal, and generating a refresh replying signal according to the refresh enabling signal, wherein the scalar stops transmitting the present display data according to the refresh replying signal; and a switch unit, electrically connected to the memory and the over driving unit, wherein when the scalar stops generating the refresh request signal, the switch unit transmits the over driving display data from the over driving unit, and when the scalar generates the refresh request signal, the switch unit transmits the refresh display data from the memory according to the refresh request signal.

2. The panel control apparatus as claimed in claim 1, wherein only when the refresh request signal is generated, the panel self refresh unit generates a refresh replying signal to cause the scalar to stop transmitting the present display data.

3. The panel control apparatus as claimed in claim 1, wherein the over driving unit comprises:

an over driving enabler, wherein the over driving enabler generates an over driving enabling signal when the refresh request signal is not generated, and the over driving enabler stops generating the over driving enabling signal when the refresh request signal is generated;

an over driving compressor, reading the previous compression data from the memory according to the over driving enabling signal; and an over driving generator, looking up an over driving table according to the previous compression data and the present display data, and generating the over driving display data accordingly.

4. The panel control apparatus as claimed in claim 3, wherein the over driving compressor further compresses the present display data into a present compression data according to the over driving enabling signal, and stores the present compression data into the memory.

* * * * *